United States Patent [19]

Weisglass

[11] 3,740,135
[45] June 19, 1973

[54] COLOR ENLARGING APPARATUS

[75] Inventor: Louis L. Weisglass, New York, N.Y.

[73] Assignee: Berkey Technical, Woodside, N.Y.

[22] Filed: Dec. 14, 1971

[21] Appl. No.: 207,823

[52] U.S. Cl.......................... 355/32, 355/71, 355/75
[51] Int. Cl........................ G03b 27/32, G03b 27/52
[58] Field of Search ................. 355/32, 35, 67, 71, 355/75, 76

[56] References Cited
UNITED STATES PATENTS
3,536,402  10/1970  Aston............................... 355/71 X
2,794,365  6/1957   Baasner et al. ...................... 355/35
2,970,514  2/1961   Collins.............................. 355/75 X Primary Examiner—Samuel S. Matthews
Assistant Examiner—Richard A. Wintercorn
Attorney—Toren & McGeady

[57] ABSTRACT

In the color enlarging apparatus disclosed, three color filters partially intercept a white light beam emerging from a light source. The filters thus divide the beam into a white portion and an intensely colored portion. The beam enters a mixing chamber through a porthole and is bounced off white-opaque dispersing walls to mix the white and intensely colored light. The light exits through a diffuser transverse to its entrance direction. The diffused light illuminates a color film, such as a slide or negative, mounted in a film carrier. Optical means then focus the light from the film onto color printing paper. A cylindrical mirror at the chamber entrance helps mix the light. The diffuser at the exit of the chamber is shaped to produce uniform intensity distribution. The surface of the carrier facing the diffuser, is painted white or mirrored. The top surface thus reflects the portion of the light which does not strike the film and directs it back through the diffuser into the chamber. The side of the diffuser facing the carrier is matted to prevent re-reflection of light by the diffuser onto the edges of the film.

13 Claims, 11 Drawing Figures

Patented June 19, 1973

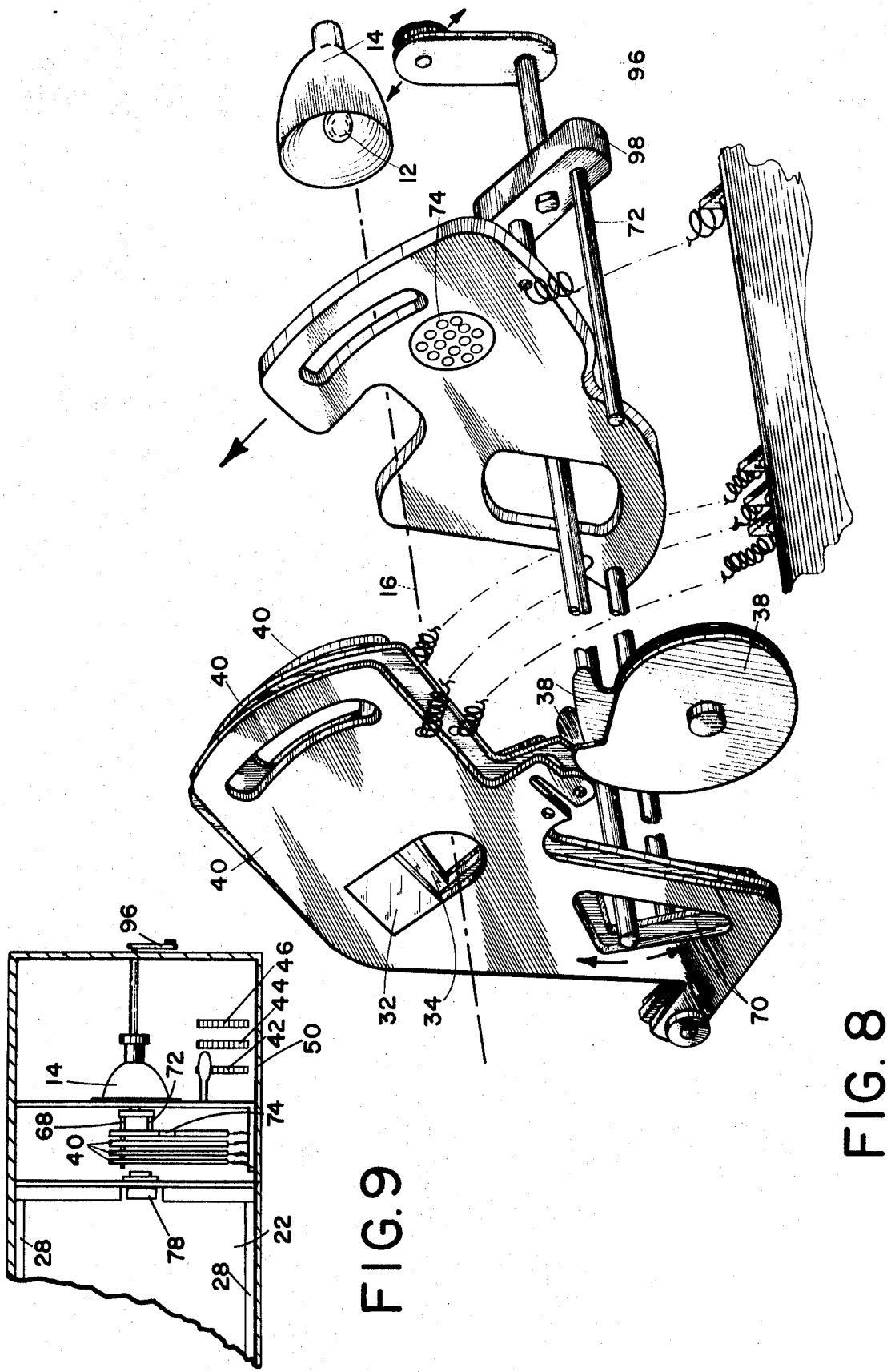

COLOR ENLARGING APPARATUS

CROSS-REFERENCE TO RELATED APPLICATION

This application is related to the following applications being filed on or about the date of this application. The contents of those applications filed concurrently herewith, or before this application, are hereby made a part of this application as if fully recited herein. All these applications are assigned to the same assignee as this application:

Application of Louis L. Weisglass and Robert A. Flieder, entitled "Illumination System for Color Enlargers and the like" Ser. No. 207,992;

Application of Louis L. Weisglass, Robert A. Flieder, and Lewis Rubin, entitled "Light Color-Control Apparatus" Ser. No. 207,809; and Application of Louis L. Weisglass, Robert A. Flieder, and Alfred Simmon, entitled "Light Source For Color Enlargers" Ser. No. 207,808.

DISCLOSURE DOCUMENT

This application contains subject matter disclosed in Disclosure Document No. 006642.

BACKGROUND OF THE INVENTION

This invention relates to photographic color enlarging apparatuses, and particularly to lamp-houses for photographic color enlargers.

In such enlarging apparatuses light is passed through a color film, such as a color negative or a color slide, whose image is to be printed, and an optical system focuses the light passed through the film onto color printing paper. It is often necessary to color the light passed through the film to compensate for the color balance of the film, the paper, and the light source. The light across the film should be substantially uniform in chromaticity, saturation and intensity. It is also desirable that the chromaticity and saturation be accurately adjustable. Furthermore, it is desirable that the light be used as efficiently as possible.

It has been suggested that such ends can be achieved by intercepting a portion of a white light beam with three color filters. These three filters then color that portion of the beam that each intercepts. The rest of the beam remains white. The colored portion of the beam is then mixed with the white portion. The respective amount that each filter intercepts the beam relative to each other filter, determines the overall color balance or chromatacity of the beam. On the other hand, the average or overall interception by all three filters determines the overall saturation. The mixing of the portions of the beam is done in a mixing chamber. There the light is bounced off the walls of the chamber and leaves through a diffuser that directs the light towards the film which is mounted in a film carrier. From there, the optical system of the enlarger focuses the image of the film onto the color printing paper.

In some enlargers the carrier includes two glass plates sandwiching the film betwween them. In other enlargers a hinged structure may hold the film between two black plates. The plates each include apertures aligned with each other. The apertures may both be the same size as the film or the image on the film. Where they are not equal the smaller of the two apertures is equal to the size of the film or image thereon.

Where the film size, or the image size, is virtually equal to the size of the cross section of light emerging from the diffuser, the enlarger utilizes virtually all of the light emerging from the diffuser. However, this size relationship does not always prevail. Mose enlargers include a rather large diffuser so that the system can be adapted over a wide range of film sizes.

Where a small film size is used in a glass faced carrier, a substantial amount of light passes around the film and ultimately appears around the printing paper. Aside from being distracting to the enlarger operator, reflections from this light around the printing paper may effect the quality of the print. For this reason, masks are often employed to absorb the light in or around the carrier so that this extraneous light never leaves the enlarger system. Where the carrier is composed of a black frame surrounding a rectangular aperture, this light is absorbed within the carrier.

In all the above cases, the smaller the film size relative to the cross section of light leaving the chamber the smaller the proportion of light emerging from the diffuser which is actually used. This results in substantial inefficiencies.

An object of this invention is to improve lamp houses and enlargers.

Another object of this invention is to eliminate such inefficiencies while at the same time maintaining the uniformities available from enlargers.

SUMMARY OF THE INVENTION

According to a feature of this invention, the before-mentioned disadvantages are obviated, and the objects achieved, by making the surface of the carrier surrounding the film-size or image-size window and facing the diffuser sufficiently reflective to reflect most of the light striking it back toward the chamber.

According to another feature of the invention, the surface facing the chamber and surrounding the aperture is painted white.

According to yet another feature of the invention, the surface facing the chamber and surrounding the aperture is mirrored.

According to another feature of the invention, the carrier is composed of glass plates to hold the negative flat. Mirror-type plates are mounted on the portion of the carrier facing the chamber to reflect the light back into the chamber. These plates include cut-outs aligned with the apertures.

By reflecting the unused light back into the chamber, substantial efficiencies are obtained. Specifically, the dispersive walls within the chamber produce multiple reflections and ultimately mix the returned light with the incoming light so that the light is again passed out through the diffuser toward the carrier.

According to yet another feature of the invention, to prevent re-reflection of light onto the edges of the film, the surface of the diffuser facing the carrier has a matte finish.

These and other features of the invention are pointed out in the claims, other objects and advantages of the invention will become obvious from the following detailed description when read in light of the accompanying drawings.

BRIEF DESCRIPTION OF THE DRAWINGS

In the drawings:

FIG. 8 is an exploded view of a filter control illustrated in FIG. 1;

FIG. 9 is a top or plan view of the structure of FIG. 8 assembled;

DESCRIPTION OF PREFERRED EMBODIMENTS

Figure 1:
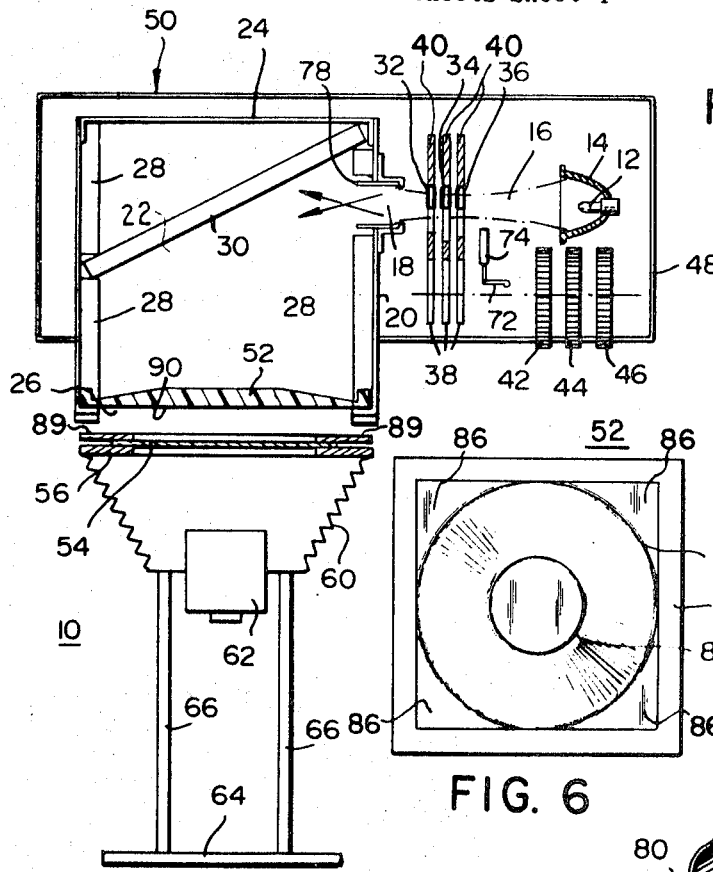
FIG. 1 is a somewhat schematic sectional elevation of an enlarger embodying features of the invention.

In the enlarging apparatus 10 of FIG. 1 a light source 12, together with an elliptical reflector 14, directs a light beam toward the entrance port 18 of the front wall 20 in a mixing chamber 22. The mixing chamber 22 is generally composed of a metal shell 24 having an exit opening 26 extending virtually across the bottom. Solid expanded white foam panels 28 align the front and side walls of the chamber while a ceiling or roof panel 30 extends angularly upward from the far end of the chamber toward the end closer to the source 12. The ceiling panel intercepts the light beam entering the entrance port. A small portion of the light may strike the wall panels 28.

Three dichroic filters 32, 34 and 36 intercept a portion of the beam so as to impart an intense color to the intercepted portion of the beam. The filters 32, 34 and 36 pass the respective subtractive primary colors, cyan, yellow, and magenta. Suitable cams 38 move respective filter holders 40 so that each filter 32, 34, and 36 intercepts a portion of the beam determined by the rotary position of the cam 38 engaging its holder 40. Each of the filters 32, 34, and 36 may then intercept different portions of the beam 16.

Suitable knurled wheels 42, 44, and 46 extending through the housing 48 of the overall light mixer 50 are each coupled individually to one of the cams 38. Thus, an operator may set the intercept proportion of the filter 32 by turning the wheel 46 to a particular position. A digital indicator, not shown, apprises the operator of the extent to which the wheel 46 has been turned, and hence the extent to which the filter 32 intercepts the beam 16. Similarly, digital indicators, coupled to the wheels 44 and 42, indicate the extent to which these wheels have been turned and the corresponding extent to which the filters 34 and 36 enter the beam 16. The cams 38 and the wheels 42, 44 and 46 are coaxial with each other and coupled by the coaxially surrounding shafts (not shown).

Within the chamber 22, the opaque ceiling panel 30, of foam material with a rough white surface, disperses the partly colored beam in all directions. Together with the remaining panels 28, each of which correspond to the panel 30 in structure, it bounces the light back and forth in all directions. The panels 28 and 30, by means of these multiple reflections, mix the white portion of the beam with the colored portion so as to achieve a degree of saturation dependent upon the overall degree to which the filters 32, 34 and 36 extend into the beam. The color of the resulting light, a factor often called chromaticity, is determined by the dgree to which each filter extends into the beam relative to the other filters.

The dispersed and mixed light leaves the chamber through a translucent opal diffusion or scattering plate 52 in the exit opening 26 so that it can illuminate an interchangeable color film, that is a negative or positive color slide, mounted in a removable film carrier. The term film as used herein refers to a developed film known as a transparency of slide, with a positive image, or a so-called color negative. The plate 52 diffuses the light as it passes through. Light then passes from the transparency or film 54 through adjustable bellows 60 to an adjustable objective 62. The latter focuses the light as modified by the film, upon printing paper (not shown) mounted on a paper carrier 64.

Suitable racks 66 support the lamp-house composed of the housing 50, the carrier 56, the manually expandable bellows 60, and the objective 62, above the paper carrier. In the usual manner, the position of the lamp-house is adjustable on the racks 66 by means of pinions for up and down movement. This adjusts the size of the image being focused on the printing paper in the print carrier 64. The housing 50 can be removed from the enlarger for servicing and adjusting.

Figure 2:
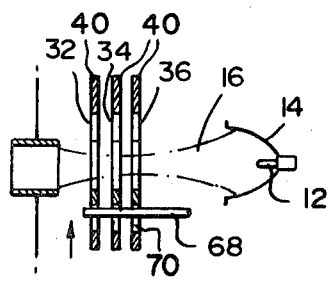
FIG. 2 is a schematic illustration of a portion of FIG. 1 with filters moved out of the path of a light beam.

An arm 68 passing loosely through the openings 70 in the holders 40 can be operated from outside the housing 50 to withdraw all the filters simultaneously from the positions in FIG. 1, out of the beam 16, and into the positions shown in FIG. 2. This allows uncolored white light from the source 12 and the reflector 14 to illiminate the negative 54. The wheels 42, 44 and 46 can only move one filter at a time with the cam 38.

Figure 3:
FIG. 3 is an axially directed drawing illustrating an attenuator of the enlarger in FIG. 1.
Figure 4:
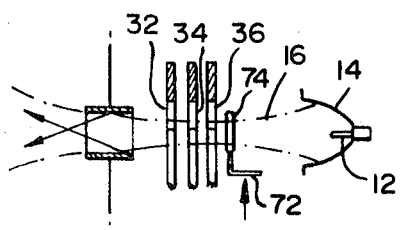
FIG. 4 is a schematic illustration showing the attenuator of FIG. 3 in the path of the beam of FIG. 1.

Moreover, an arm 72 operable from outside the housing 50 can move a light attenuator 74, such as shown in FIG. 3, from the position shown in FIG. 1 to the position shown in FIG. 4. The light attenuator is composed of a metal plate having a plurality of evenly distributed light perforations 76. When moved into the position shown in FIG. 4, the light attenuator reduces the overall intensity of the light beam emerging from the source 12 and the reflector 14. It this dims the illumination of the film 54 and the image on the paper in the carrier 64.

The nature of the source 12 and the reflector 14 is such as to make the beam converge to a narrow waist and then diverges shown in FIGS. 1 to 3. The filters are located to intercept the beam at the waist, that is the narrowest portion, of the beam. The beam thereafter diverges as it enters the chamber 22. As the diverging light beam passes through the entrance port 18, a cylindrical mirror having an interior reflecting surface 80 reflects the outer margin of the beam diagonally across the beam. In this way, a substantial portion of the light from one side of the beam now passes to the other side. Thus, a substantial proportion of the colored part of the beam is reflected to the white portion and a substantial proportion of the white part of the beam toward the colored portion. By adjustment of the position and length of the mirror 78 it is possible to equalize the amount of white and colored light throughout each side. This greatly improves the mixing process within the mixing chamber.

Figure 6:
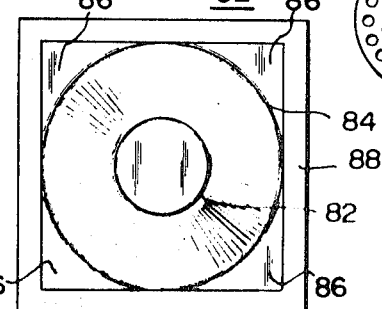
FIG. 6 is a plan view of a diffusing plate used in FIG. 1.
Figure 5:
FIG. 5 is a perspective view of a cylindrical mirror in FIG. 1.
Figure 7:
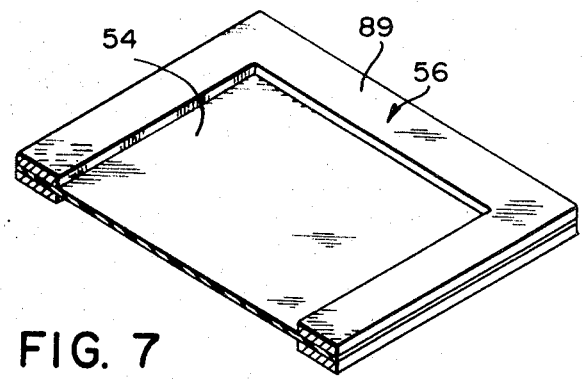
FIG. 7 is a perspective view of a film carrier forming a part of FIG. 1.

The translucent diffusion plate 52 at the bottom of the exit 26 tapers outwardly from a thick circular center 82 toward a thin circular rim 84 as shown in FIGS. 1 and 6. From the circular rim 84 the material remains thin at the corner margins 86 toward a thickened, square, support frame 88. The entire plate is monolithic and composed of a diffusing or scattering material. The diffusing plate exhibits a variable degree of diffusion, that is, the diffusion is greater at the center and gradually tapers off toward the rim 84. The diffusing plate is constructed by molding or machining a material which has a diffusion characteristic that is a function of its thickness. Therefore, increasing the thickness increases the diffusion. To obtain the desired effect, it is then only necessary to produce a greater thickness at the center than toward the edges. According to one embodiment of the invention, an acrylic resin with minute reflective particles in suspension is used for the diffusing plate material. Such a material has the desired characteristics of increasing diffusion with thickness.

Since it is the property of the diffuser to scatter in all directions, each ray of light impinging upon it, and the amount of scattering is related to the amount of diffusion, it follows that the variable diffusing plate will scatter more of its light at the center and transmit more at its edges. As a result, more light is transmitted at the edges and less at the center.

This selective transmission at the edges as compared with the center has the effective compensating for the fall-off in intensity from the center to the edges experienced when using a uniform diffusing plate. This results from the cosine law fall-off occurring from the center of the light beam toward the edges. The chamber maintains this fall-off.

In the past such fall-off had been avoided to some extent by using some type of density means to block some of the light striking the diffuser in the center. This had the effect of improving the light distribution. However, this method absorbs a significant amount of light energy, thereby lowering the overall efficiency.

Another advantage of the diffusion plate 52 is that some of the scattered light returns to the chamber while the remaining light passes through the diffuser. This effect is very desirable because a large percentage of the light is scattered back toward the chamber by the center of the diffusing plate. At the edges a large amount is transmitted and a smaller amount reflected back.

Aside from producing uniformity, the diffusing plate increases efficiency, because when the light is reflected back it is re-reflected by the panels or walls of the mixing chamber and eventually passes through the diffusing plate 54 again. Thus, the total light output of the system is raised significantly.

As can be seen from FIG. 1, a portion of the light emerging from the chamber 22 through the diffusing plate 52 passes through the film 54. The remainder of the light strikes the top surface 89 of the carrier 56. The top surface 89 is painted white. This white paint reflects the light from the chamber back through the diffusing plate 52 into the chamber. There the panels 28 and 30 disperse the light. The returning light thus is bounced back and forth by the panels. These multiple reflections cause the re-entered light to be mixed again with the light passing through the port 18. Little of the light can pass outwardly through the small port 18. The cylindrical mirror 78 helps in this regard. Ultimately, the re-entered light passes outwardly through the diffusing plate 52 toward the film 54 and the carrier 56. There the process repeats itself again.

The light passing through the film 54 is focused by the optical system composed of the adjustable bellows 60 and the objective 62 upon printing paper supported by the paper carriers 64.

The bottom surface 90 of the plate 52 has a matte finish. This prevents the light from adversely affecting its distribution after it has been reflected by the white surface 89 on the carrier 56. In particular, it prevents the plate 52 from re-reflecting the upwardly directed light.

FIGS. 8 and 9 illustrate details of the mechanism which moves the filters 32, 34 and 36 in response to the wheels 42, 44, and 46. A lever 96 when turned downwardly moves the arms 72 so that the attenuator 74 enters the light beam. The same lever 96, when moved upwardly, causes the arm 68 to draw the holders 40 and hence the filters 32, 34 and 36 back out of the path of the beam. This allows for a simple means to produce an all-white light, or dim exposure with but a single lever.

It can be seen from FIGS. 8 and 9, that the movement of the filters 32, 34 and 36 in FIGS. 1, 2 and 3 is shown somewhat schematically. That is, the filters do not move precisely up and down. Rather, they move angularly.

Figure 10:
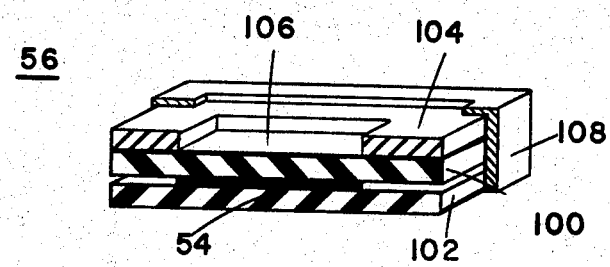
FIG. 10 is a perspective view of another embodiment of film carrier.

FIG. 10 illustrates another embodiment of the carrier 56. Here two glass plates 100 and 102 sandwich the film 54 between them. The plate 100 is covered by a mirror 104 which includes an aperture 106 aligned with the outline of the film 54. A suitable clamping device 108 holds the plates 100 and 102 as well as the film 54 and the mirror 104 together. The mirror 104 performs the function of the white paint on the surface 89.

Figure 11:
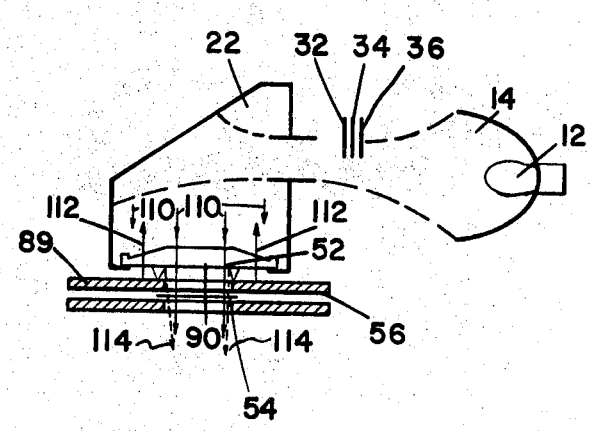
FIG. 11 is a schematic illustration of the effect of the reflecting surface of FIG. 7.

FIG. 11 is a schematic diagram illustrating the effect of the reflecting surface 89. Here light passing out of the chamber 22, illustrated by arrows 110 passes in part through the film 54. A portion of the light is, however, reflected back through the plate 52 from the surface 89. This is shown by the arrows 112. The matted surface 90 prevents the light represented by the arrows 112 from being re-reflected by the bottom of plate 52 into the marginal or border areas of the film 54. This possibility which is avoided is shown by the broken arrows 114. The reflection illustrated by the broken arrows 114 would destroy the uniform intensity distribution achieved by the shape of the plate 52. The matte finish on the surface 90 prevents the border intensification. The mirror may be spaced above the carrier.

The reflecting surface 89 or mirror 104 cooperate with the tapered plate 52, the cylindrical mirror 78 and the bottom 90 with the matte finish to render the color and light distribution as uniform as possible.

Without the mirror 78 the mixing chamber 22 fails to effect perfect mixing. As a result, a residual portion of the more intensely colored light may remain on one side of the chamber while the other side remains white. This may have the effect of creating a "color wedge" at the printing paper. The cylindrical mirror thus aids the mixing chamber in its function.

The reflective surface 89 and the mirror 104 also help the mixer to overcome color wedging by reflecting light emerging at the margins of the plate 52 back into the mixer. If one side of the light emerging is more intensely colored than the other, the reflections produced by the carriers tend to increase the multiple reflections within the chamber. This tends to complete the mixing effect and eliminate color disparities. This is especially important with the tapered plate 52. The thinness of the plate's marginal areas may tend to limit its back-scattering of light into the chamber. Thus, the plate 52 would not be as effective as possible in overcoming color wedging.

Aside from the above the white surface 89 and the mirror 104 increase the efficiency of the system.

Ordinarily, light passing from the chamber 22 strikes the negative or film 54. However, when the negative 54 is smaller than the plate 52, it must be held in a film carrier having larger borders. Where these borders are large, they block out a considerable amount of light. If this light were not reflected by the surface 89 or the mirror 104, it might be substantially lost. By reflecting it, it can re-enter the chamber and be reutilized. If this reflected light were then again reflected downwardly by the surface 90 of the plate 52, the downwardly reflected light would be concentrated near the edges of the film. Such reflective light would again re-distort the uniformity by distribution by increasing the intensity around the margin. The reflector or mirror may be located at a distance above the carrier, with a space between.

In operation the user of the enlarger turns on the source 12 and then, on the basis of measurements of the density and color in the film 54, turns the wheels 42, 44 and 46 to positions suitable for compensating the color balance in the film 54. The light from the source 12 is formed into a beam 14 which becomes partly colored by the filters 32, 34 and 36. One portion of the beam is thus intensely colored while the other portion is completely white. The cylindrical mirror reflects part of one side of the beam toward the other and vise versa. The thus reflected beam in part strikes the panels 28 but mainly the ceiling panel 30 of the chamber 22. The light on the ceiling is scattered throughout the chamber so that it bounces off the various panels 28 and 30 until it emerges, mixed, through the diffusion plate 52. The diffusion plate redistributes the intensity of the light so that it is substantially uniform. This light then strikes the film 54 within the carrier 56, as well as the surface 89 or the mirror 104 of the carrier 56. The optical system composed of the adjustable bellows 60, the objective 62 then focus the light emerging from the film 54 onto printing paper on the carrier 64. The surface 89 or the mirror 104 reflect unused light back into the chamber through the surface 90 and the plate 52 to increase the efficiency of the entire system.

While an embodiment of the invention has been described in detail, it will be obvious to those skilled in the art that the invention may be embodied otherwise without departing from its spirit and scope.

What is claimed is:

1. A lamp-house apparatus for making color prints, comprising source means for forming a light beam, filter means in the path of a portion of the bam for coloring the portion of the beam, mixing chamber means having an opening in the path of the beam and opaque reflective dispersing means for mixing the light of the beam entering said chamber means, said chamber means having an exit window for allowing egress of the light from said chamber means, a transparent diffusing plate covering the window for diffusing light as it leaves said chamber means, and flat film carrier means adjacent the plate and having a first side facing said diffusing plate and a second side facing away from said diffusing plate, said film carrier means forming apertures on each side for allowing passage of light therethrough, said carrier means having portions on each side adjacent the aperture and substantially surrounding the apertures, said carrier means including reflective means on the portions of said first side to reflect most of the light striking for reflecting light which fails to pass through the aperture and strikes the portions on the first side.

2. An apparatus as in claim 1, wherein said reflective means is composed of white paint.

3. An apparatus as in claim 1, wherein said reflective means includes mirror means.

4. A lamp-house apparatus for making color prints, comprising source means for forming a light beam, filter means in the path of a portion of the beam for coloring the portion of the beam, mixing chamber means having an opening in the path of the beam and opaque reflecting dispersing means for mixing the light of the beam entering said chamber means, said chamber means having an exit window for allowing egress of the light from said chamber means, a transparent diffusing plate covering the window for diffusing light as it leaves said chamber means, and flat film carrier means adjacent the plate and having a first side facing said diffusing plate and a second side facing away from said diffusing plate, said film carrier means forming apertures on each side for allowing passage of light therethrough, said carrier means including reflective means on said first side to reflect most of the light striking the first side, said diffusing means having a surface facing outwardly of said chamber means and a surface facing inwardly of said chamber means, said outwardly facing surface having a matte finish.

5. An apparatus as in claim 4, wherein said reflective means includes a white painted surface.

6. An apparatus as in claim 4, wherein said reflective means includes mirror means.

7. A color enlarging apparatus, comprising a lamp-house, light source means in said lamp-house for forming a light beam, adjustable filter means in said lamp-house and in the path of a portion of the beam for coloring the portion of the beam, mixing chamber means in said lamp-house and having an opening the path of the beam and opaque dispersing means for mixing the light of the beam entering said chamber means, said chamber means having an exit window for allowing exit of light from said chamber means, a translucent diffusing plate in said lamp-house covering the window for diffusing light as it leaves the chamber means, optical means in said lamp-house for focusing light emerging from said diffusing plate, printing paper holding means for holding printing paper near the focus of said optical means, adjustable mounting means for supporting said lamp-house and adjusting it relative to said holding means, and film carrier means in said lamp-house between said diffusing plate and said optical means, said carrier means being flat and having a first side facing said diffusing plate and a second side facing away from said diffusing plate, said carrier means being adapted to receive film for printing and forming apertures for allowing light therethrough, said carrier means having portions on each side adjacent the apertures and substantially surrounding the apertures, said carrier means having reflecting means on the portions substantially surrounding said apertures on the first side for reflecting light which fails to pass through the aperture and strikes the portion on the first side.

8. An apparatus as in claim 7, wherein said reflecting means includes white paint.

9. An apparatus as in claim 7, wherein said reflecting means includes a mirror.

10. A color enlarging apparatus, comprising a lamp-house, light source means in said lamp-house for forming a light beam, adjustable filter means in said lamp-house and in the path of a portion of the beam for coloring the portion of the beam, mixing chamber means in said lamp-house and having an opening in the path of the beam and opaque dispersing means for mixing the light of the beam entering said chamber means, said chamber means having an exit window for allowing exit of light from said chamber means, a translucent diffusing plate in said lamp-house covering the window for diffusing light as it leaves the chamber means, optical means in said lamp-house for focusing light emerging from said diffusing plate, printing paper holding means for holding printing paper near the focus of said optical means, adjustable mounting means for supporting said lamp-house and adjusting it relative to said holding means, and film carrier means in said lamp-house between said diffusing plate and said optical means, said carrier means being flat and having a first side facing said diffusing plate and a second side facing away from said diffusing plate, said carrier means being adapted to receive film for printing and forming apertures for allowing light therethrough, said carrier means having reflecting means surrounding said apertures on the first side, said diffusing plate having a surface facing outwardly of said chamber means and a surface facing inwardly of said chamber means, said outwardly facing surface having a matte finish.

11. An apparatus as in claim 10, wherein said reflecting means includes a surface painted white.

12. An apparatus as in claim 10, wherein said reflecting means includes a mirror.

13. A lamp-house apparatus for making color prints, comprising source means for forming a light beam, filter means in the path of a portion of the beam for coloring the portion of the beam, mixing chamber means having an opening in the path of the beam and opaque reflective dispersing means for mixing the light of the beam entering said chamber means, said chamber means having an exit window for allowing egress of the light from said chamber means, a transparent diffusing plate covering the window for diffusing light as it leaves said chamber means, flat film carrier means adjacent the plate and forming an aperture for allowing passage of light therethrough at the location of a transparency, and reflective means located in the path of light from the diffusion plate toward said carrier means and substantially surrounding the aperture for reflecting light which fails to pass through the aperture toward said diffusion plate.

* * * * *

UNITED STATES PATENT OFFICE
CERTIFICATE OF CORRECTION

Patent No. 3,740,135　　　　　　　　Dated June 19, 1973

Inventor(s) Louis L. Weisglass

It is certified that error appears in the above-identified patent and that said Letters Patent are hereby corrected as shown below:

In the heading of the patent, the name of the assignee should read:

--Berkey Photo, Inc.--

Signed and sealed this 15th day of January 1974.

(SEAL)
Attest:

EDWARD M. FLETCHER, JR.　　　　　　RENE D. TEGTMEYER
Attesting Officer　　　　　　　　　Acting Commissioner of Patents